United States Patent
Apostolo et al.

(10) Patent No.: US 6,809,166 B2
(45) Date of Patent: Oct. 26, 2004

(54) AMORPHOUS PERFLUORINATED COPOLYMERS

(75) Inventors: Marco Apostolo, Novara (IT); Francesco Triulzi, Milan (IT); Vincenzo Arcella, Milan (IT); Vito Tortelli, Milan (IT); Pierangelo Calini, Milan (IT)

(73) Assignee: Solvay Solexis S.p.A., Milan (IT)

( * ) Notice: Subject to any disclaimer, the term of this patent is extended or adjusted under 35 U.S.C. 154(b) by 79 days.

(21) Appl. No.: 10/139,645

(22) Filed: May 7, 2002

(65) Prior Publication Data

US 2002/0177667 A1 Nov. 28, 2002

(30) Foreign Application Priority Data

May 7, 2001 (IL) ..................................... MI2001A0921
Apr. 19, 2002 (IL) ..................................... MI2002A0833

(51) Int. Cl.$^7$ ............................................. C08F 114/18
(52) U.S. Cl. ..................... 526/247; 526/242; 524/462; 525/326.2; 428/542.8
(58) Field of Search ................................ 526/247, 242; 524/462; 428/542.8; 525/326.2

(56) References Cited

U.S. PATENT DOCUMENTS

| | | | |
|---|---|---|---|
| 4,789,717 A | 12/1988 | Giannetti et al. | 526/209 |
| 4,864,006 A | 9/1989 | Giannetti et al. | 526/209 |
| 4,966,435 A | 10/1990 | Matsumoto et al. | 350/96.34 |
| 5,326,839 A * | 7/1994 | Resnick | 428/457 |
| 5,498,682 A | 3/1996 | Navarrini et al. | 526/247 |
| 5,883,177 A * | 3/1999 | Colaianna et al. | 524/462 |
| 6,300,526 B1 * | 10/2001 | Navarrini et al. | 568/614 |
| 2002/0183471 A1 * | 12/2002 | Russo et al. | 526/247 |
| 2003/0022073 A1 * | 1/2003 | Wang | 430/5 |

FOREIGN PATENT DOCUMENTS

| | | |
|---|---|---|
| EP | 0 226 668 A1 | 7/1987 |
| EP | 0 302 513 A1 | 2/1989 |
| EP | 0 338 755 A2 | 10/1989 |
| EP | 0 710 855 A1 | 8/1996 |
| EP | 0 784 064 A1 | 7/1997 |
| EP | 0 752 598 A1 | 8/1997 |
| EP | 0 645 406 A1 | 3/1999 |
| EP | 0 918 060 A1 | 5/1999 |
| EP | 0 969 025 A1 | 1/2000 |

OTHER PUBLICATIONS

Ando, S. et al., "Perfluorinated polymers for optical waveguides", Chem. Tech., Dec. 1994; pp. 20–27.
Grulke, E. "Solubility Parameter Values"; Polymer Handbook, 3a ed., p. VII/519–559 (Ed. Brandrup e Immergut).
Koike, Y. et al., "Origin of Excess Light Scattering in Poly(methyl methacrylate) Glasses", Macromolecules, 1992; 25:4807–4815.
Pianca, M. et al., "End groups in fluoropolymers", Journal of Fluorine Chemistry; 1999; 95:71–84.

* cited by examiner

*Primary Examiner*—David W. Wu
*Assistant Examiner*—Henry S Hu
(74) *Attorney, Agent, or Firm*—Arent Fox PLLC

(57) ABSTRACT

Amorphous perfluorinated copolymers, comprising cyclic perfluorinated units deriving from at least two different perfluorinated comonomers, optionally with units deriving from a perfluorinated monomer containing at least one olefinic unsaturation (perfluoroolefin), or comprising cyclic perfluorinated units and units deriving from a perfluorinated monomer containing at least one olefinic unsaturation, said perfluorinated copolymers having the following combination of properties:

substantial absence of unstable polar end groups,
polymer Tg higher than 120° C.,
narrow monomeric composition distribution.

26 Claims, No Drawings

AMORPHOUS PERFLUORINATED COPOLYMERS

The present invention relates to amorphous perfluorinated polymers for optical applications, in particular optical fibers, the preforms obtained therefrom, and a process for preparing said polymers.

With the term "preform" it is generallty meant a compact and transparent solid formed by polymers having optical properties.

The polymer optical fibers (POF) have a core-sheath structure. Compared with the optical fibers wherein the core is based on quartz or multicomponent glass, POFs generally show the following advantages:
higher diameter,
improved flexibility (according to "bending test")
improved number opening (difference of the refractive index between core and sheath),
improved connection easiness to the light source.

Polymer optical fibers having a core of polymethylmethacrylate, polystyrene or polycarbonate and a sheath of a perfluoroalkylmethacrylate polymer are at present on the market. At wave lengths of 400–600 nm polymethylmethacrylate acrylate POFs show a good attenuation, of the order of 150–400 dB/Km. At wave lengths higher than 650 nm the attenuation of said POFs becomes very high. This represents a drawback since on industrial scale sources of light at wave lengths higher than 700 nm, up to the near infrared, are used.

U.S. Pat. No. 4,966,435 describes POFs having a good transmission to the light both in the visible spectrum and in the near infrared and an excellent thermal resistance. In said fibers the core is a copolymer of a PD or PDD perfluorodioxole. Said copolymers are substantially amorphous, have a Tg higher than 100° C., a refractive index which can be controlled between 1.29 and 1.40 in function of the comonomer, and can easily be transformed into optical fibers having an uniform diameter. The thermal resistance of said substantially amorphous copolymers is high, the number of the unstable end groups being lower than 5 meq/Kg, preferably lower than 2 meq/Kg. This reduced number of end groups is obtained by treating the polymers with amines or alcohols and subsequently by reacting with fluorine at a temperature lower than the polymer Tg and comprised between 20° C. and 200° C. The sheath is formed by a PD/TFE copolymer. The core-sheath fibers obtained according to said patent have an attenuation of 270 dB/km at 650 nm, 330 dB/Km at 780 nm and 285 dB/km at 1,550 nm. Said values are too high for "last mile" or LAN (Local Area Network) applications, wherein an attenuation lower than 100 dB/km in the range 700–1,550 nm is required.

EP 710,855 describes graded refractive index POFs having an improved band amplitude, formed by an amorphous polymer and by at least another polymer (doping agent) having refractive index different of at least 0.001 units from that of the amorphous polymer. The doping agent is distributed in the fiber so as to have a concentration gradient from the centre to the cable periphery. The fluoropolymer contains cyclic structures; in particular when alicyclic polymers are used the attenuation is higher than 100 dB/km at a wave length between 700 and 1,550 nm. Said attenuation results too high for LAN applications.

EP 752,598 describes graded refractive index POFs similar to those of previous patent, wherein a third component, having a specular concentration gradient with respect to that of the doping agent, is used, to maintain contact the Tg along the fiber diameter. As third component a perfluoropolyether having the structure

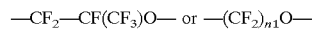

is used, wherein n1 is an integer from 1 to 3. Preferably the number average molecular weight of the perfluoropolyether is from 300 to 10,000. In the Examples of said patent it is described that fibers having a Tg of 82° C. can have an attenuation of 100 dB/Km at 780 nm and 65 dB/Km at 1,550 nm. In the comparative Examples it is shown that in absence of PFPE the attenuation increases to 400 dB/Km at 780 nm, and to 280 dB/Km at 1,550 nm, while the Tg ranges from 82° C. in the core to 102° C. in the sheath respectively. In absence of PFPE microvacua are present in the fibers. The optical fibers obtainable according to said patent have the drawback to have a very low Tg for LAN applications, which require a fiber Tg higher than 100° C. (S. Ando et al., ChemTech. Dec. 1994 20–27).

The need was felt to have available amorphous perfluorinated polymers for optical applications in particular for optical fibers, having the following combination of properties:
attenuation values lower than 100 dB/km at wave lengths from 500 to 1,550 nm;
Tg higher than 120° C.;
high thermal resistance;
narrow distribution of the monomeric composition of the amorphous perfluorinated copolymer according to the following test: the polymer is dissolved at a concentration of 5% w/w in perfluoroheptane solvent, after filtration on PTFE filter having a maximum pore diameter of 0.2 micron, no polymer residue remains on the filter; the filter weight before and after filtration remains unchanged.

The Applicant has unexpectedly and surprisingly found perfluorinated amorphous polymers which solve this technical problem.

An object of the present invention are amorphous perfluorinated copolymers, comprising cyclic perfluorinated units deriving from at least two different perfluorinated comonomers, optionally with units deriving from a non cyclic perfluorinated monomer, or which does not cyclize during the polymerization, containing at least one olefinic unsaturation (perfluoroolefin), or comprising cyclic perfluorinated units and units deriving from a non cyclic perfluorinated monomer, or which does not cyclize during the polymerization, containing at least one olefinic unsaturation, said perfluorinated copolymers having the following combination of properties:
substantial absence of unstable polar end groups, in particular end groups as COF, COOH or their amidic derivatives, esters or salts; said end groups being not detectable in the copolymer, i.e. present in an amount lower than 0.05 mmoles/kg polymer when they are determined by Fourier transform IR spectroscopy by Nicolet® Nexus FT-IR equipment (256 scannings, resolution 2 $cm^{-1}$), wherein:
on a sintered polymer powder pellet having 5 mm diameter and thickness from 50 to 300 micron (corresponding to a weight of 1.75 and 10.5 mg of polymer, respectively) a scanning between 4,000 $cm^{-1}$ and 400 $cm^{-1}$ is initially carried out, the pellet being then kept for 12 hours in an environment saturated with ammonia vapours;
the IR spectrum is finally recorded under the same conditions of the initial IR spectrum;
the two spectra are elaborated by subtracting from the signals of the spectrum relating to the untreated sample (initial spectrum) those corresponding to the specimen spectrum after exposure to ammonia vapours;

the "difference" spectrum is obtained, which is normalized by the following equation:

$$\frac{\text{"Difference spectrum"}}{[\text{pellet weight (g)/pellet area (cm}^2)]}$$

the optical densities related to the end groups which have reacted with the ammonia vapours are measured, which give rise to detectable peaks in the IR spectrum, said end groups being the COOH and COF groups;

the optical densities are converted in mmoles/kg polymer using the extinction coefficients reported in Table 1, page 73 of the paper by M. Pianca et Al. "End groups in fluoropolymers", J. Fluorine Chem. 95 (1999), 71–84 (herein incorporated by reference); the so found values give the concentrations of the residual polar end groups as mmoles of polar end groups/kg polymer: in the spectrum of the amorphous (per)fluorinated polymers after fluorination bands related to COOH groups (3,600–3,500, 1,820–1,770 cm$^{-1}$) and/or COF groups (1,900–1,830 cm$^{-1}$) are not detectable, the method detectability limit being 0.05 mmoles/Kg polymer;

polymer Tg higher than 120° C., preferably 125° C.; narrow distribution of the monomeric composition of the amorphous perfluorinated copolymer measured according to the following test: the polymer is dissolved at a concentration of 5% w/w in perfluoroheptane solvent, after filtration on PTFE filter having a maximum pore diameter of 0.2 micron, no polymer residue remains on the filter whereby the filter weight before and after filtration remains unchanged.

The amorphous perfluorinated polymers according to the present invention do not substantially contain C—H bonds.

The perfluorinated monomers which give polymers containing cyclic structures, are selected from the following:

perfluorodioxoles, wherein optionally one or two fluorine atoms are substituted with chlorine atoms;

non conjugated dienes having the following formulas:

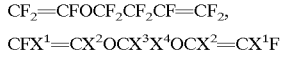

wherein $X^1$ and $X^2$, equal to or different from each other, are F, Cl; $X^3$ and $X^4$, equal to or different from each other, are F or $CF_3$, which during the polymerization cyclopolymerize.

The preferred perfluorodioxoles are those having the following formula:

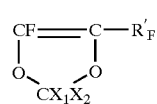

(IA)

wherein $R'_F$ is equal to F, $R_F$ or $OR_F$ wherein $R_F$ is a linear or branched when possible perfluoroalkyl radical having 1–5 carbon atoms; $X_1$ and $X_2$ equal to or different from each other being F or $CF_3$.

Preferably in formula (IA) $R'_F=OR_F$, $R_F$ is preferably $CF_3$; $X_1=X_2=F$, and the compound is known as TTD. Another preferred cyclic monomer is that having formula (IA) wherein $R'_F=F$; $X_1=X_2=F$, and the compound is known as PD.

The non cyclic perfluorinated comonomers, or which do not cyclize during the polymerization, containing at least one ethylene unsaturation, are selected from the following:

$C_2$–$C_8$ perfluoroolefins, such as TFE, hexafluoropropene (HFP);

(per)fluoroalkylvinylethers (PAVE) $CF_2=CFOR_f$, wherein $R_f$ is a $C_1$–$C_6$ (per)fluoroalkyl, for example $CF_3$, $C_2F_5$, $C_3F_7$;

perfluoro-oxyalkylvinylethers $CF_2=CFOX$, wherein X is: a $C_1$–$C_{12}$ alkyl, or a $C_1$–$C_{12}$ oxyalkyl, or a $C_1$–$C_{12}$ perfluoro-oxyalkyl having one or more ether groups, for example perfluoro-2-propoxy-propyl.

The perfluorinated polymers of the invention can contain also as non cyclic comonomer or which does not cyclize during the polymerization, containing one ethylene unsaturation, in substitution or in addition to the above comonomers, also non cyclic $C_2$–$C_8$, fluoroolefins or which do not cyclize during the polymerization, containing one or two chlorine atoms, such as chlorotrifluoroethylene (CTFE).

When the amorphous polymer optionally contains units deriving from a non cyclic perfluorinated monomer, or which does not cyclize during the polymerization, containing at least one olefinic unsaturation, it contains cyclic units deriving from either different cyclic monomers or a cyclic monomer and a monomer which cyclizes during the polymerization.

The amounts expressed in per cent by moles of cyclic units deriving from either different cyclic monomers or a cyclic monomer and a monomer which cyclizes during the polymerization range from 60% to 100% by moles, preferably from 80% to 100%.

When the amorphous polymer contains units deriving from a non cyclic perfluorinated monomer or which does not cyclize during the polymerization and containing at least one olefinic unsaturation, it contains cyclic units deriving from a cyclic monomer, or from two different cyclic monomers, or from a cyclic monomer and a monomer which cyclizes during the polymerization.

The amounts expressed in per cent by moles of cyclic units deriving from a cyclic monomer, or from two different cyclic monomers or from a cyclic monomer and a monomer which cyclizes during the polymerization range from 60% to 99.5%, preferably from 80% to 95%.

When the copolymer contains units deriving from a non cyclic perfluorinated monomer or which does not cyclize during the polymerization and containing at least one olefinic unsaturation, it can optionally be present a second non cyclic perfluoroolefin or which does not cyclize during the polymerization, different from that already present, selected from the above non cyclic perfluoroolefins or which do not cyclize in polymerization, in amounts in per cent by moles from 0 to 20%, preferably lower than 10%.

The preferred copolymers according to the present invention are the copolymers obtained by copolymerizing:

the perfluorodioxoles of formula (IA) having TTD structure, with TFE;

the perfluorodioxoles of formula (IA) having TTD structure, with perfluorodioxoles of formula (IA) having PD structure.

The dioxoles and their copolymers, before being subjected to the process according to the present invention, as described hereafter, are prepared by polymerization for example according to U.S. Pat. Nos. 5,498,682 and 5,883, 177. The amorphous polymers can be prepared according to polymerization methods in emulsion, suspension and bulk according to known methods of the prior art. In particular amorphous polymers can be prepared by monomer copolymerization in aqueous emulsion, according to known methods of the prior art, in the presence of radical initiators for example alkaline or ammonium persulphates, perphosphates, perborates or percarbonates, optionally in combination with ferrous, cupreous or silver salts, or other easily oxidizable metals. In the reaction medium also anionic, cationic and non ionic, hydrogenated and fluorinated surfactants are usually present, among which fluorinated surfactant are particularly preferred. The polymerization reaction is generally carried out at temperatures in the range 25°–150° C., using a pressure up to 10 MPa. The preparation of amorphous perfluorinated copolymers is preferably carried out in microemulsion of (per) fluoropolyoxyalkylenes, according to U.S. Pat. Nos. 4,789, 717 and 4,864,006. Optionally in polymerization well known chain transfer agents of the prior art can also be used.

The determination of the narrow distribution of he monomeric composition of the amorphous perfluorinated polymer of the invention, as said, is carried out according to the following wing test: the polymer is dissolved at a 5% concentration w/w in perfluoroheptane, after having filtered the solution on PTFE filter having a maximum pore diameter of 0.2 micron, no polymer residue remains on the filter; in other terms the filter weight before and after filtration remains unchanged.

A further object of the present invention is a process for preparing the above perfluorinated polymers, including also the homopolymers formed by cyclic units deriving even from only one cyclic monomer or from a monomer which cyclizes during the polymerization, comprising the foollowing steps:

I) dissolution of the amorphous perfluorinated polymer in a solvent inert to fluorination, having solubility parameter defined as in Polymer Handbook 3th ed. page VII 519, (Ed. Brandrup and Immergut), from 5.5 to 8.2 $(cal/cm^3)^{1/2}$, the polymer being dissolved at a concentration, expressed in per cent by weight, from 0.5% to 15%, preferably from 3% to 8%;

II) polymer fluorination in solution by treatment with elementary fluorine, optionally in admixture with inert gases, in the presence of ultraviolet radiations having a wave length from 200 to 500 nm, at temperatures lower than 100° C.;

III) solution filtration on PTFE filter having a maximum pore diameter of 0.2 μm, recovery of the filtrate; the filtrate contains the amorphous perfluorinated polymers of the present invention usable for optical applications;

IV) optionally, solvent removal and recovery of the amorphous perfluorinated polymers usable for optical applications. In step I) one must use, as said, at least a solvent inert to fluorination, having solubility parameter defined as in Polymer Handbook 3th ed. page VII 519, (Ed. Brandrup and Immergut), from 5.5 to 8.2 $(cal/cm^3)^{1/2}$. Solvents which satisfy the solubility parameter are preferably selected from perfluoroheptane, known as Galden®D80, perfluorobutyl-tetrahydrofuran, perfluoropropyl-tetrahydropyran, perfluoropolyether having b.p. 165° C., known as Galden®LS 165, tertiary perfluoroamines, etc.

In step I) to the organic solution also a doping compound can optionally be added, in an amount expressed in per cent by weight on the perfluoropolymer, from 1% to 30%, preferably from 5% to 20%. With doping compound (see hereunder) a substance is meant whose refractive index differs from that of the perfluoropolymer of at least 0.001 units, preferably of 0.005 units.

In step II) the used radiation has a wave length ranging from 200 to 500 nm; a mercury lamp Hanau TQ 150 can for example be used. By fluorination the amount of polar end groups in the polymer is reduced and results undetectable with the above described infrared spectroscopy method. Therefore their residual amount is lower than the method detectability limit which, as said, is of 0.05 mmoles/kg polymer. The reaction temperature in step II) ranges from 0° C. to <+100° C., preferably from +20° C. to +50° C.

As said, the determination of the polar end groups before and after fluorination is carried out by IR spectroscopy, performing a scanning between 4,000 $cm^{-1}$ and 400 $cm^{-1}$, on a sintered polymer powder pellet which can have a thickness from 50 to 300 micron. The fluorination process ends when by IR spectroscopy bands related to COOH groups (3,600–3,500, 1,820–1,770 $cm^{-1}$) and/or COF groups (1,900–1,830 $cm^{-1}$) are no longer detectable. The method detectability limit is 0.05 mmoles/Kg polymer.

In step III) the temperature at which the filtration is carried out is in the range 0°–100° C., preferably it is the room temperature (20°–25° C.).

In step IV) the solvent is removed by means of known methods, for example by stripping under vacuum.

The amorphous perfluorinated polymer obtained at the end of the process according to the present invention, shows the combination of the above properties:

attenuation values lower than 100 dB/km at wave lengths from 500 to 1,550 nm;

Tg higher than 120° C.;

high thermal resistance;

narrow distribution of the monomeric composition as above defined.

The amorphous perfluorinated polymer obtained at the end of the process according to the present invention when step IV) is carried out, can be processed to obtain the preform. In this case the polymer is introduced in a vessel, for example of glass or porcelain, or metal coated by semi-crystalline fluoropolymers, such for example PFA, FEP, PTFE, then the temperature is increased over the fluoropolymer Tg, preferably to values from 50° C. to 100° C. higher than the fluoropolymer Tg. The temperature is kept for a time sufficient to allow the polymer compacting by gravity, or by applying a pressure. Optionally it is possible to use vacuum and pressure cycles. At the end of the treatment the temperature is gradually lowered to room temperature. In said way the preform of the amorphous perfluorinated polymer usable for optical applications is obtained.

The preform can optionally contain, in a total amount expressed in per cent by weight on the perfluoropolymer, from 1% to 30%, preferably from 5% to 20% of additives, preferably doping agents and/or perfluoropolyethers.

The used doping agents are fluorinated compounds substantially C—H bonds free and can be selected from the group comprising compounds having a low molecular weight, oligomers and polymers containing an aromatic ring, for example benzenic or naphthalenic, and/or one or more halogen atoms, selected from Cl, Br and Iodine, or a functional group such for example a ketonic group or an ether function. Examples of dopants are: 1,3-dibromo-tetrafluorobenzene, 1,4-dibromo-tetrafluorobenzene, 2-bromotetrafluorobenzotrifluoride, halogenpentafluorobenzene wherein the halogen is as above; decafluorobenzophenone, perfluoroacetophenone, perfluorodiphenyl, chloroheptafluoronaphthalene, bromoheptafluoronaphthalene; chlorotrifluoroethylene oligomers with optionally a second perfluoroolefinic monomer selected from the above fluoropolymer non cyclic monomers.

Other optional components that the preform can contain are perfluoropolyethers containing in the chain one or more of the following units: —CF$_2$—CF(CF$_3$)O—, —CF(CF$_3$)—CF$_2$O—, —(CF$_2$)$_{n1}$O— wherein n1 is an integer from 2 to 3, —CFX$_1$O— wherein X$_1$=F, CF$_3$ having number average molecular weight preferably from 300 to 10,000, still more preferably from 500 to 2,500, which can be used as doping agents and as Tg regulators. The perfluoropolyether compounds are well known in the prior art and on the market.

The homopolymers formed by cyclic units deriving even from only one cyclic monomer or from a momomer which cyclizes during the polymerization, obtainable with the invention process, result novel with respect to the homopolymers available on the market but which have not been subjected to fluorination and filtration steps according to the present invention.

The polymers obtainable with the process of the present invention and the corresponding preforms optionally comprising also the other above compounds (doping compounds and perfluoropolyethers) are characterized by a high transparency at wave lengths from 500 to 1,550 nm, and are usable for preparing manufactured articles for optical applications, such for example optical wave guides, optical components, optical lens and windows, optical fibers, graded index and step index.

Tests carried out by the Applicant have shown that by increasing the wave length from 400 to 1,550 nm the attenuation tends to decrease. Therefore on the basis of the attenuation value measured at 514 nm, as indicated in the Examples of the present invention, the attenuation at higher wave lengths is equal to or lower than the values measured at 514 nm.

The following Examples illustrate the invention without limiting the scope thereof.

EXAMPLES

Attenuation Measurement Method

The attenuation calculation has been effected according to the method reported in Koike et Al., Macromolecules, vol. 25 page 4807, 1992.

The polymer under the form of compact transparent solid cylinder, is subjected to scattering measurements by the Laser Light scattering (LLS) technique. The LLS measurement is carried out on the polymer cylinder immersed in distilled water in an optical glass test tube immersed in toluene. The wave length is 514.5 nm, the laser power has been fixed at 90 mW with a detectability pinhole of 400 $\mu$m. The specimen is kept under rotation at 25 rpm to allow a space average during the measurement. The scattering has been measured at 90°, with acquisition times of 0.5 s. The attenuation is calculated considering the scattering intensity independent of the angle. In the calculation only the vertical component of the scattered light has been considered.

Polar (Ionic) End Group Determination by IR Spectroscopy

A small amount of the specimen (3.5 mg) is put under a press (3.5 ton/cm$^2$) and a pellet having a 5 mm diameter and 100 micron thickness is prepared.

The spectrum from 4,000 to 400 cm$^{-1}$ is recorded by Nicolet® Nexus FT-IR equipment (250 scannings, resolution 2 cm$^{-1}$).

The pellet is transferred in an environment saturated with ammonia vapours. After 12 hours the specimen is taken from the ammonia saturated environment and the IR spectrum is recorded again under the same conditions.

By subtracting from the signals of the spectrum relating to the specimen as such those corresponding of the specimen spectrum after exposure to ammonia vapours, the "difference" spectrum is obtained, which is normalized by the following equation:

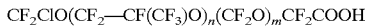

$$\frac{\text{"Difference spectrum"}}{[\text{pellet weight (g)/pellet area (cm}^2)]}$$

The optical densities related to the end groups which have reacted with the ammonia vapours are measured. They are generally COOH or COF groups. The optical densities are transformed into mmoles/kg polymer using the extinction coefficients shown in Table 1, page 73 of the paper by M. Pianca et Al. "End groups in fluoropolymers", J. Fluorine Chem. 95 (1999), 71–84. The found values express the concentrations of the residual polar end groups as mmoles of polar end groups/kg polymer. The detectability limit is 0.05 mmoles/Kg polymer.

Polymer Tg Determination

The Tg is measured by DSC.

Test of Narrow Distribution of the Monomeric Composition

The test is carried out with the following procedure: the polymer is dissolved at 5% concentration w/w in perfluoroheptane having a solubility parameter 5.8, and the obtained solution is filtered on PTFE membrane having a maximum pore diameter of 0.2 micron. After filtration, no polymer residue has to remain on the filter whereby the filter weight before and after filtration must remain unchanged.

Example 1

Preparation of Copolymer TFE/TTD 20/80

In a 5 l AISI 316 autoclave, equipped with stirrer working at 650 rpm, after vacuum has been made by oil pump, are introduced in sequence 2,790 ml of demineralized water, 6.67 g/liter H$_2$O of microemulsion obtained by mixing:

7.5 ml of a perfluoropolyoxyalkylene having acid end group of formula:

$$CF_2ClO(CF_2—CF(CF_3)O)_n(CF_2O)_mCF_2COOH$$

wherein n/m=10, having average molecular weight 600;

7.5 ml of an aqueous NH$_3$ solution at 30% by volume;

15 ml of demineralized water;

4.5 ml of Galdeno® D02 of formula:

$$CF_3O(CF_2—CF(CF_3)O)_n(CF_2O)_mCF_3$$

wherein n/m=20, having average molecular weight 450.

The autoclave is heated up to 75° C. and at this temperature 33.3 g/liter H$_2$O of TTD are added. The pressure inside the autoclave is brought to 1.4 MPa by TFE gas. Subsequently 210 ml of a solution 0.0925 M of potassium persulphate are introduced. After about 10 minutes the reaction starts. The reaction pressure is kept constant by feeding in a semicontinuous way, at each decrease of the inner pressure of 0.05 MPa, liquid TTD and gaseous TFE in the ratio by weight TTD/TFE=1.4. The reaction is stopped after having fed in the whole about 320 g of TTD. The latex is degassed and it has a 15% by weight concentration of solid. It is coagulated by adding HNO$_3$ at 65% w/w, the polymer is separated from the aqueous phase, it is washed twice with demineralized water and dried in a stove at 85° C. for 100 h.

The polymer Tg is about 134.7° C. corresponding to a composition by moles 20/80 TFE/TTD. The intrinsic viscosity measured at 30° C. in perfluoroheptane (Galdeno®D80) is equal to 36.6 cc/g. By IR analysis the polymer results to contain a residual amount of the polar COOH groups of 6 mmoles/Kg polymer.

Example 2

Preparation of a copolymer TFE/TTD 20/80 for optical applications according to the process of the present invention and preform achievement 255 grams of the copolymer of Example 1, in the form of white powder are dissolved in 3,000 ml of Galden® D80 maintaining the stirring for 2 hours. The solution is degassed by feeding nitrogen for two hours at 22° C. in a 5 l photochemical glass reactor equipped with mechanical stirrer and a mercury vapour immersion UV lamp (Hanau TQ 150) and then subjected to fluorination for 31 h at 35° C. by feeding a mixture 1:1 by volume of nitrogen/fluorine in the presence of the UV radiation. The solution after fluorination is filtered on PTFE membranes having a maximum pore diameter of 0.2 μm by a filter under pressure at 0.15 MPa.

The compound remained on the filter has been characterized by IR spectrum and DSC. The IR spectrum shows that it is a fluorinated polymer containing TTD. The DSC measurement shows for the fluorinated polymer remained on the filter a Tg of 100° C., corresponding to a composition on a molar basis 50/50 TFE/TTD.

The polymer IR analysis has shown that the concentration of the polar groups is lower than 0.05 mmoles/Kg polymer (method detectability limit).

The solvent is removed from the filtered solution by evaporation under vacuum with a temperature gradient starting from 50° C. up to 280° C., until obtaining the dry polymer.

The polymer is introduced in a test tube having a lenght of 20 cm and a diameter of 2 cm, and kept liquid at the temperature of 280° C. for one hour, then it is slowly cooled, with a decreasing temperature profile, to room temperature in a time of 12 h. A cylinder having sizes of 2 cm×5.2 cm (preform) is obtained.

The polymer cylinder has been subjected to scattering measurements by the Laser Light scattering (LLS) technique as above described. The attenuation is equal to $17 \times 10^{-5}$ dB/cm (17 dB/km) at 514 nm.

The polymer IR analysis has shown that the concentration of the polar groups is lower than 0.05 mmoles/Kg polymer (method detectability limit).

The polymer dissolved at a concentration of 5% by weight in Galden® D80 and filtered on a PTFE membrane having a maximum pore diameter of 0.2 μm does not leave residues on the filter. The filter, dried at 150° C. for 1 h and weighed by a precision balance has the same weight as the initial weight.

Example 3 (Comparative)
Fluorination of a Copolymer TFE/TTD 20/80

250 g of the polymer prepared according to Example 1 have been treated as in Example 2, omitting the filtration on PTFE membrane having pores of 0.2 μm.

The polymer IR analysis has shown that the concentration of polar groups is lower than 0.05 mmoles/Kg polymer (method detectability limit).

A cylinder having 2 cm×5.2 cm sizes is obtained.

The polymer cylinder has been subjected to scattering measurements by the Laser Light scattering (LLS) technique as above described. The attenuation is 0.00927 dB/cm (927 dB/km) at 514 nm.

The polymer dissolved at a concentration of 5% by weight in Galden® D80 and filtered on a PTFE membrane having a maximum pore diameter of 0.2 μm leaves an evident polymer residue on the filter equal to 1.69 g.

The compound remained on the filter has been characterized by IR spectrum and DSC. The IR spectrum shows that it is a fluorinated polymer containing TTD. The DSC measurement shows for the fluorinated polymer remained on the filter a Tg of 100° C., corresponding to a composition on a molar basis 50/50 TFE/TTD.

Example 4 (Comparative)
Filtration of a Copolymer TFE/TTD 20/80

Example 2 is repeated omitting only the fluorination step.

The polymer IR analysis has shown that the concentration of polar groups is of 6 mmoles/Kg polymer.

A cylinder having 2 cm×5.2 cm sizes is obtained.

The polymer cylinder has been subjected to scattering measurements by the Laser Light scattering (LLS) technique as above. The attenuation is equal to 0.06 dB/cm (6,000 dB/km) at 514 nm.

The polymer dissolved at a concentration of 5% by weight in Galden®D80 and filtered on a PTFE membrane having a maximum pore diameter of 0.2 μm does not leave residues on the filter. The filter, dried at 150° C. for 1 h and weighed by a precision balance has the same weight as the initial weigh.

Example 5
Preparation of Copolymer TFE/TTD 20/80

The preparation of the copolymer of Example 1 is repeated by obtaining a polymer having a Tg of about 133.1° C. The intrinsic viscosity, measured at the temperature of 30° C. in perfluoroheptane is 35.2 ml/g. By IR analysis the polymer results to contain a residual amount of the polar COOH groups of 6 mmoles/Kg polymer.

Example 6

Preparation of a copolymer for optical applications according to the process of the present invention, and achievement of the preform, by using the amorphous perfluorinated polymer prepared in Example 5.

Example 2 is repeated, by using the polymer of Example 5, except the fluorination time, which is 42 h instead of 31 h.

The compound remained on the filter has been characterized by IR spectrum and DSC. The IR spectrum shows that it is a fluorinated polymer containing TTD. The DSC measurement shows for the fluorinated polymer remained on the filter a Tg of 100° C., corresponding to a composition on a molar basis 50/50 TFE/TTD.

The polymer IR analysis has shown that the concentration of the polar groups is lower than 0.05 mmoles/Kg polymer (method detectability limit).

The solvent is removed as described in Example 2 and the polymer treated as described until obtaining a cylinder having 2 cm×4.3 cm sizes (preform).

The polymer cylinder has been subjected to scattering measurements by the Laser Light scattering (LLS) technique as above described. The attenuation is equal to $26 \times 10^{-5}$ dB/cm (26 dB/krm) at 514 nm.

The polymer dissolved at a concentration of 5% by weight in Galden®D80 and filtered on a PTFE membrane having a maximum pore diameter of 0.2 μm does not leave residues on the filter. The filter, dried at 150° C. for 1 h and weighed by a precision balance has the same weight as the initial weight.

Example 7
Preparation of Copolymer TFE/TTD 20/80

The preparation of the copolymer of Example 1 is repeated obtaining a polymer having a Tg of about 137.4° C. The intrinsic viscosity, measured at the temperature of 30° C. in perfluoroheptane is 40.0 ml/g. By IR analysis the polymer results to contain a residual amount of the polar COOH groups of 6 mmoles/kg polymer.

Example 8

Preparation of a copolymer for optical applications according to the process of the present invention, and achievement of the preform, using the amorphous perfluorinated polymer prepared in Example 7.

Example 2 is repeated, by using the polymer of Example 7, with a fluorination time of 30 h.

The polymer IR analysis has shown that the concentration of the polar groups is lower than 0.05 mmoles/Kg polymer (method detectability limit).

In the preform preparation step the polymer is introduced in a test tube having a length of 20 cm and a diameter of 2 cm and kept liquid at the temperature of 280° C. for one hour, then slowly cooled, with a decreasing temperature profile, to room temperature in a time of 24 h. A cylinder having 2 cm×6.34 cm sizes is obtained.

The polymer cylinder has been subjected to scattering measurements by the Laser Light scattering (LLS) technique as above. The attenuation is equal to $12 \times 10^{-5}$ dB/cm (12 dB/km) at 514 nm.

The polymer dissolved at a concentration of 5% by weight in Galden®D80 and filtered on a PTFE membrane having a maximum diameter of 0.2 μm does not leave residues on the filter. The filter, dried at 150° C. for 1 h and weighed by a precision balance has the same weight as the initial weight.

What is claimed is:

1. Amorphous perfluorinated copolymers, comprising:
   A) cyclic perfluorinated units deriving from at least two different perfluorinated comonomers, optionally with units deriving from a non cyclic perfluorinated monomer, or which does not cyclize during the polymerization, wherein said amorphous perfluorinated copolymer contains at least one olefinic unsaturation, or
   B) cyclic perfluorinated units and units deriving from a non cyclic perfluorinated monomer, or which does not cyclize during the polymerization, wherein said amorphous perfluorinated copolymer contains at least one olefinic unsaturation, and wherein said amorphous perfluorinated copolymer has the following combination of properties:
   substantial absence of unstable polar end groups; said end groups being not detectable in the copolymer, i.e. present in an amount lower than 0.05 mmoles/kg polymer when they are determined by Fourier transform IR spectroscopy by Nicolet® Nexus FT-IR equipment at 256 scannings, resolution 2 cm$^{-1}$, wherein:
   on a sintered polymer powder pellet having 5 mm diameter and thickness from 50 to 300 micron, corresponding to a weight of 1.75 and 10.5 mg of polymer, respectively, a scanning between 4,000 cm$^{-1}$ and 400 cm$^{-1}$ is initially carried out, the pellet being then kept for 12 hours in an environment saturated with ammonia vapours;
   the IR spectrum is finally recorded under the same conditions of the initial IR spectrum;
   the two spectra are elaborated by subtracting from the signals of an initial spectrum relating to the untreated sample those corresponding to the specimen spectrum after exposure to ammonia vapours;
   the "difference" spectrum is obtained, which is normalized by the following equation:

$$\frac{\text{"Difference spectrum"}}{[\text{pellet weight (g)}/\text{pellet area (cm}^2)]}$$

the optical densities related to the end groups which have reacted with the ammonia vapours are measured, which give rise to detectable peaks in the IR spectrum, said end groups being the COOH and COF groups;
   the optical densities are converted in mmoles/kg polymer using the extinction coefficients shown in Table 1, page 73 of the paper by M. Pianca et al., "End groups in fluoropolymers", J. Fluorine Chem. 95 (1999), 71–84 the so found values give the concentrations of the residual polar end groups as mmoles of polar end groups/kg polymer: in the spectrum of the amorphous (per)fluorinated polymers after fluorination bands between 3,600–3,500 or 1,820–1,770 cm$^{-1}$ related to COOH groups and/or bands between 1,900–1,830 cm$^{-1}$ related to COF groups are not detectable, the method detectability limit being 0.05 mmoles/Kg polymer;
   polymer Tg higher than 120° C.,
   narrow distribution of the monomeric composition of the amorphous perfluorinated copolymer measured according to the following test: the polymer is dissolved at a concentration of 5% w/w in perfluoroheptane solvent, after filtration on PTFE filter having a maximum pore diameter of 0.2 micron, no polymer residue remains on the filter whereby the filter weight before and after filtration remains unchanged.

2. Amorphous perfluorinated copolymers according to claim 1, wherein the perfluorinated monomers which give polymers containing cyclic structures, are selected from the following:
   perfluorodioxoles, wherein optionally one or two fluorine atoms are substituted with chlorine atoms;
   non conjugated dienes having the following formulas:

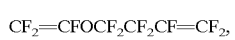

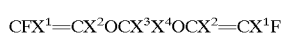

wherein $X^1$ and $X^2$, equal to or different from each other, are F, Cl; $X^3$ and $X^4$, equal to or different from each other, are F or CF$_3$, which during the polymerization cyclopolymerize.

3. Amorphous perfluorinated copolymers according to claim 2, wherein the perfluorodioxoles have the following formula:

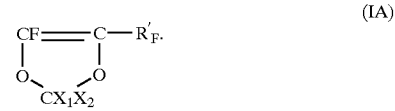
   (IA)

wherein R'$_F$ is equal to F, R$_F$ or OR$_F$ wherein R$_F$ is a linear or branched perfluoroalkyl radical having 1–5 carbon atoms; $X_1$ and $X_2$ equal to or different from each other being F or CF$_3$.

4. Amorphous perfluorinated copolymers according to claim 3, wherein in formula (IA) R'$_F$=OR$_F$; $X_1$=$X_2$=F (TTD).

5. Amorphous perfluorinated copolymers according to claim 4, wherein R$_F$ is CF$_3$.

6. Amorphous perfluorinated copolymers according to claim 3, wherein in formula (IA) R'$_F$=F; $X_1$=$X_2$=F (PD).

7. Amorphous perfluorinated copolymers according to claim 1, wherein the non cyclic perfluorinated comonomers, or which do not cyclize during the polymerization, containing at least one ethylene unsaturation, are selected from the following:

$C_2$–$C_8$ perfluoroolefins;

(per)fluoroalkylvinylethers (PAVE) $CF_2=CFOR_f$, wherein $R_f$ is a $C_1$–$C_6$ (per)fluoroalkyl;

perfluoro-oxyalkylvinylethers $CF_2=CFOX$, wherein X is a $C_1$–$C_{12}$ perfluoro-oxyalkyl having one or more ether groups.

8. Amorphous perfluorinated copolymers according to claim 7, wherein the $C_2$–$C_8$ perfluoroolefins are TFE or hexafluoropropene (HFP).

9. Amorphous perfluorinated copolymers according to claim 7, wherein the $C_1$–$C_6$ (per)fluoroalkyl is $CF_3$, $C_2F_5$ or $C_3F_7$.

10. Amorphous perfluorinated copolymers according to claim 7, X is-perfluoro-2-propoxy-propyl.

11. Amorphous perfluorinated copolymers according to claim 1, comprising non cyclic $C_2$–$C_8$ fluoroolefins, or which do not cyclize during the polymerization, containing one or two chlorine atoms.

12. Amorphous perfluorinated copolymers according to claim 11, wherein said non cyclic $C_2$–$C_8$ fluoroolefins are chlorotrifluoroethylene (CTFE).

13. Amorphous perfluorinated copolymers according to claim 1, wherein when the amorphous polymer optionally contains units deriving from a non cyclic perfluorinated monomer, or which does not cyclize during the polymerization, containing at least one olefinic unsaturation, it contains cyclic units deriving from either different cyclic monomers or a cyclic monomer and a monomer which cyclizes during the polymerization.

14. Amorphous perfluorinated copolymers according to claim 13, wherein the amount expressed in percent by moles of cyclic units deriving either from different cyclic monomers or from a cyclic monomer and a monomer which cyclizes during the polymerization ranges from 60% to 100% by moles.

15. Amorphous perfluorinated copolymers according to claim 14, wherein the amount expressed in percent by moles of cyclic units deriving either from different cyclic monomers or from a cyclic monomer and a monomer which cyclizes during the polymerization ranges from 80% to 100% by moles.

16. Amorphous perfluorinated copolymers according to claim 1, wherein when the amorphous polymer contains units deriving from a non cyclic perfluorinated monomer, or which does not cyclize during the polymerization, containing at least one olefinic unsaturation, it contains cyclic units deriving from a cyclic monomer, or from two different cyclic monomers, or from a cyclic monomer and a monomer which cyclizes during the polymerization.

17. Amorphous perfluorinated copolymers according to claim 16, wherein the amount expressed in percent by moles of cyclic units deriving from a cyclic monomer, or from two different cyclic monomers or from a cyclic monomer and a monomer which cyclizes during the polymerization ranges from 60% to 99.5%.

18. Amorphous perfluorinated copolymers according to claim 17, wherein the amount expressed in percent by moles of cyclic units deriving from a cyclic monomer, or from two different cyclic monomers or from a cyclic monomer and a momomer which cyclizes during the polymerization ranges from 80% to 95% by moles.

19. Amorphous perfluorinated copolymers according to claim 16, optionally comprising a second non cyclic perfluoroolefin or which does not cyclize during the polymerization, different from that already present, selected from the group consisting of $C_2$–$C_8$ perfluoroolefins; non-cyclic $C_2$–$C_8$ fluoroolefins containing one or two chlorine atoms in amounts in percent by moles from 0 to 20%.

20. Amorphous perfluorinated copolymers according to claim 19, wherein the $C_2$–$C_8$ perfluoroolefins are TFE or hexafluoropropene (HFP).

21. Amorphous perfluorinated copolymers according to claim 19, the non-cyclic $C_2$–$C_8$ fluoroolefins containing one or two chlorine atoms are chlorotrifluoroethylene (CTFE).

22. Amorphous perfluorinated copolymers according to claim 19, wherein the second non cyclic perfluoroolefin or which does not cyclize during the polymerization is in amounts lower than 10% by moles.

23. Amorphous perfluorinated copolymers according to claim 1, obtainable by copolymerizing:

the perfluorodioxoles of formula (IA) having TTD structure, with TFE;

the perfluorodioxoles of formula (IA) having TTD structure, with perfluorodioxoles of formula (IA).

24. Amorphous perfluorinated copolymers according to claim 23, obtainable by copolymerizing the perfluorodioxoles of formula (IA) having TTD structure with PD.

25. Amorphous perfluorinated copolymers according to claim 1, wherein the unstable polar end groups are COF, COOH or their amidic derivatives, esters or salts.

26. Amorphous perfluorinated copolymers according to claim 1, wherein the polymer Tg is 125° C.

* * * * *